(12) United States Patent
Pradier

(10) Patent No.: US 7,484,424 B2
(45) Date of Patent: Feb. 3, 2009

(54) DEVICE AND METHOD FOR DETERMINING THE WEIGHT AND/OR A CHARACTERISTIC VALUE OF THE POSITION OF THE CENTRE OF GRAVITY OF AN AIRCRAFT

(75) Inventor: Jean-Clair Pradier, Velizy Villacoublay (FR)

(73) Assignee: Messier-Bugatti, Velizy Villacoublay (FR)

( * ) Notice: Subject to any disclaimer, the term of this patent is extended or adjusted under 35 U.S.C. 154(b) by 240 days.

(21) Appl. No.: 11/396,550

(22) Filed: Apr. 4, 2006

(65) Prior Publication Data

US 2006/0243855 A1 Nov. 2, 2006

(30) Foreign Application Priority Data

Apr. 4, 2005 (FR) .................................. 05 03316

(51) Int. Cl.
*G01N 5/00* (2006.01)
(52) U.S. Cl. ....................................................... 73/802
(58) Field of Classification Search .................. 73/808, 73/802; 701/124; 703/802
See application file for complete search history.

(56) References Cited

U.S. PATENT DOCUMENTS

| 4,622,639 | A | * | 11/1986 | Adelson et al. ............. 701/124 |
| 4,935,885 | A | * | 6/1990 | McHale et al. .............. 702/175 |
| 5,205,514 | A | | 4/1993 | Patzig et al. |
| 5,410,109 | A | | 4/1995 | Tarter et al. |
| 5,571,953 | A | * | 11/1996 | Wu ........................... 73/65.06 |
| 5,583,777 | A | * | 12/1996 | Power ........................ 701/124 |
| 6,128,951 | A | * | 10/2000 | Nance ....................... 73/178 T |
| 6,353,793 | B1 | * | 3/2002 | Godwin et al. .............. 701/124 |
| 6,415,242 | B1 | * | 7/2002 | Weldon et al. .............. 702/173 |

FOREIGN PATENT DOCUMENTS

| WO | 95/02167 | 1/1995 |
| WO | WO 2004/074787 | 9/2004 |
| WO | WO 2004/102144 | 11/2004 |

* cited by examiner

*Primary Examiner*—Max Noori
(74) *Attorney, Agent, or Firm*—Young & Thompson

(57) ABSTRACT

Method and device for determining the weight and/or a characteristic value of the position of the center of gravity of an aircraft standing on the ground by means of a plurality of undercarriages, each undercarriage including at least one structural element exhibiting a variable level of stresses depending on the fraction of the weight of the aircraft transmitted to the ground through the undercarriage. The method includes the steps of
a) measuring on each undercarriage at least one parameter representing the stress level of the element; and b) evaluating the characteristic value and/or the weight according to the parameters measured in step a). At least one parameter measured in step a) is a magnetic or electrical characteristic of the structural element of the undercarriage.

18 Claims, 4 Drawing Sheets

Figure 1:
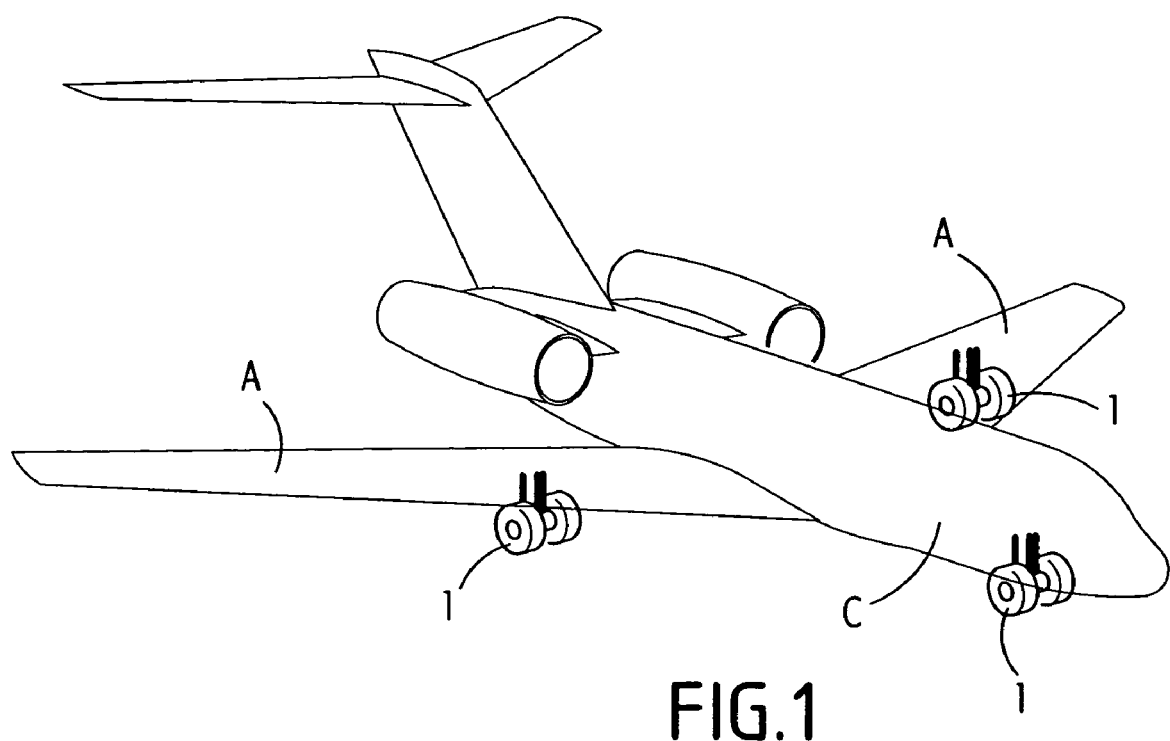

DEVICE AND METHOD FOR DETERMINING THE WEIGHT AND/OR A CHARACTERISTIC VALUE OF THE POSITION OF THE CENTRE OF GRAVITY OF AN AIRCRAFT

The invention relates to a method for determining different values such as the weight and the position of the center of gravity of an aircraft standing on the ground.

More precisely, the invention relates, according to a first aspect, to a method of determining the weight and/or a characteristic value of the position of the centre of gravity of an aircraft standing on the ground by means of a plurality of undercarriages, each undercarriage comprising at least one structural element exhibiting a variable level of stresses depending on the fraction of the weight of the aircraft transmitted to the ground through said undercarriage, this method comprising the following steps:

a/ measurement on each undercarriage of at least one parameter representing the stress level of said element;
b/ evaluation of the characteristic value and/or of the weight according to the parameters measured in step a/.

Methods of this type are known in the prior art, the mechanical stresses undergone by the structural elements being obtained by measuring micro-displacements, representing the stresses of the material of the elements according to the laws of elasticity.

These methods have the defect of being difficult to use. The measurement means used are heavy and/or difficult to install in the undercarriages of existing aircraft.

In this context, the purpose of the present invention is to propose a method and implementing means which can not weigh down the aircraft and which can be simple to implement.

For this purpose the method of the invention, of the aforesaid type, is essentially characterized in that at least one parameter measured in step a/ is a magnetic or electrical characteristic of the structural element of the undercarriage.

In one embodiment of the invention, the magnetic or electrical characteristic measured is a characteristic chosen from the group consisting of the magnetic permeability, the electrical conductivity and the electrical permittivity of the material constituting the structural element.

Advantageously, the magnetic or electrical characteristic is measured by means of a Foucault current sensor.

For example, step b/ comprises a sub-step b1/ of evaluation of the fraction of the weight of the aircraft transmitted to the ground by each undercarriage as a function of the parameters measured in step a/, and a sub-step b2/ of determining the position of the center of gravity of the aircraft as a function of the fractions evaluated in sub-step b1/.

In this case, the fraction of the weight of the aircraft transmitted through each undercarriage is evaluated as a function of the magnetic or electrical characteristic measured in step a/ by means of a transfer function.

Advantageously, the magnetic or electrical characteristic is measured in a single direction along which the level of stresses in the structural element varies as a function of the fraction of the weight of the aircraft transmitted to the ground through said undercarriage.

In this case, there is measured on the structural element in step a/ the magnetic or electrical characteristic in at least one other predetermined direction and/or the variation of the magnetic or electrical characteristic resulting from the torsion or shear force imposed on the structural element, these measurements being used to refine the evaluation of the representative value carried out in step b/.

According to a second aspect, the invention relates to a device for determining the weight and/or a characteristic value of the position of the centre of gravity of an aircraft standing on the ground by means of a plurality of undercarriages, each undercarriage comprising at least one structural element exhibiting a level of stresses that varies as a function of the fraction of the weight of the aircraft transmitted to the ground through said undercarriage, this device comprising on each undercarriage at least one sensor for measuring a parameter representing the stress level of said element and means for determining the characteristic value as a function of the measured parameters, characterized in that the sensor is able to measure, as a representative parameter, a magnetic or electrical characteristic of the structural element of the undercarriage.

According to an advantageous aspect of the invention, the sensor is able to measure a magnetic or electrical characteristic chosen from the group consisting of the magnetic permeability, the electrical conductivity and the electrical permittivity of the material constituting the structural element.

Preferably, the sensor for measuring the magnetic or electrical characteristic is a Foucault current sensor.

For example, the device comprises means for evaluating the fraction of the weight of the aircraft transmitted to the ground though each undercarriage as a function of the measured parameters, and means for evaluating the position of the center of gravity of the aircraft as a function of the evaluated fractions.

In this case, the means for determining the fraction of the weight of the aircraft transmitted through each undercarriage comprise at least one transfer function.

According to a third aspect, the invention relates to an aircraft comprising a plurality of undercarriages able to stand on the ground whilst supporting the weight of the aircraft and a device for determining the weight and/or a characteristic value of the position of the centre of gravity of the aircraft having the above characteristics, each undercarriage comprising at least one structural element exhibiting a level of stresses that varies as a function of the fraction of the weight of the aircraft transmitted to the ground through said undercarriage.

Figure 2:
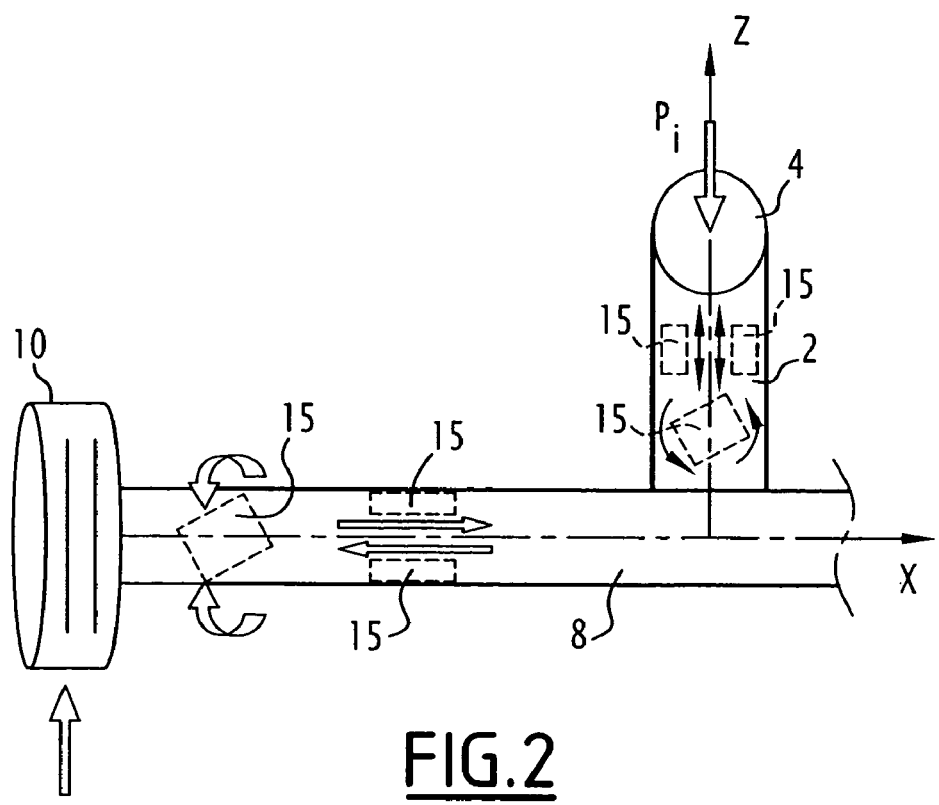
Figure 3:
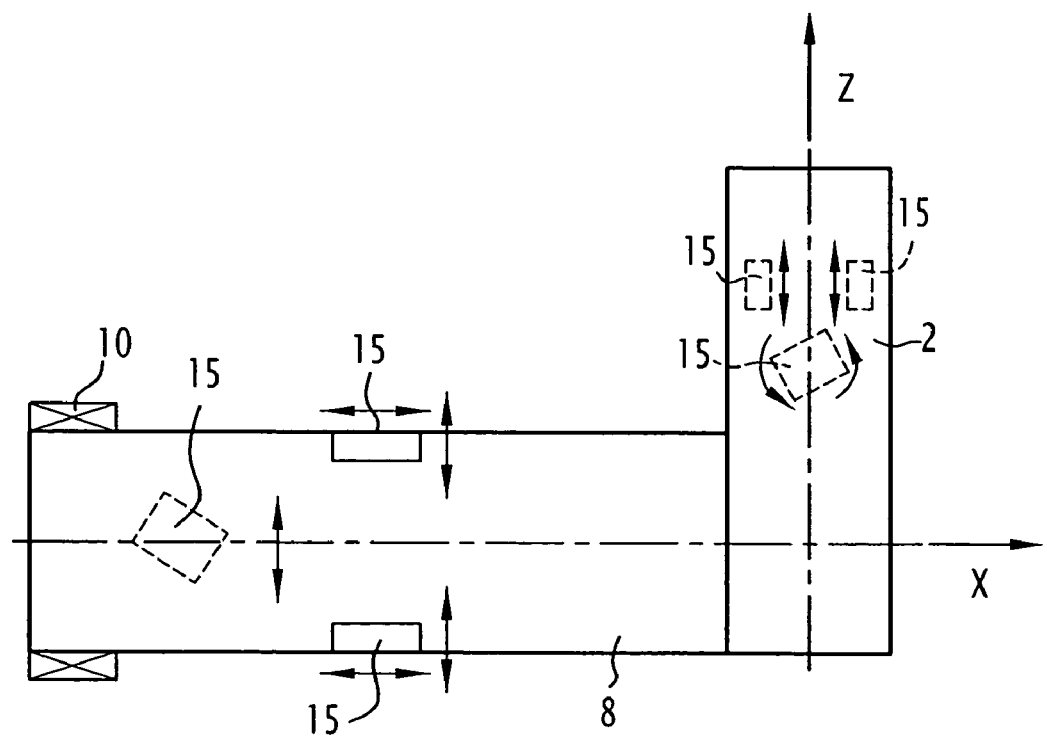
Figure 4:
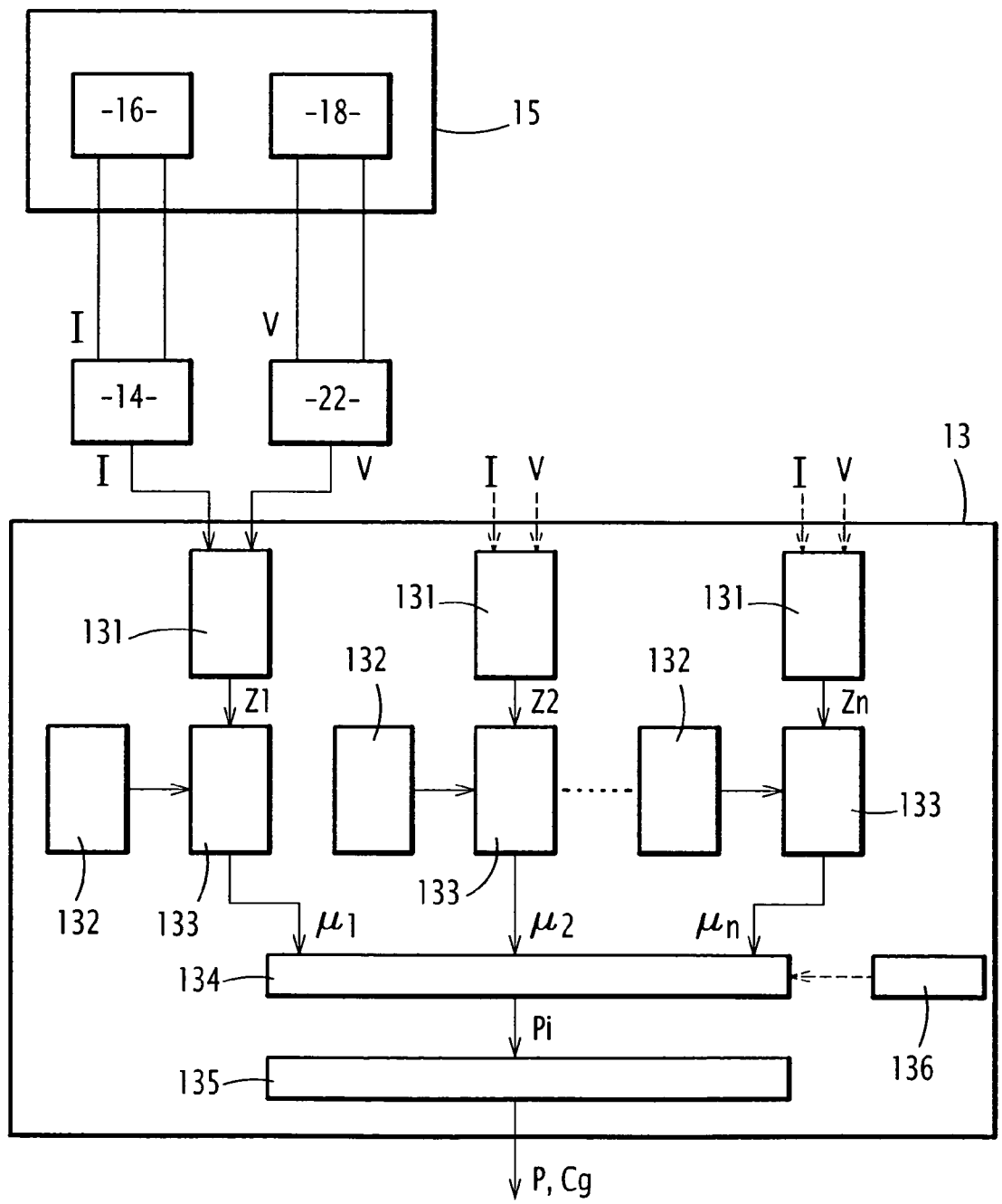
Figure 5:
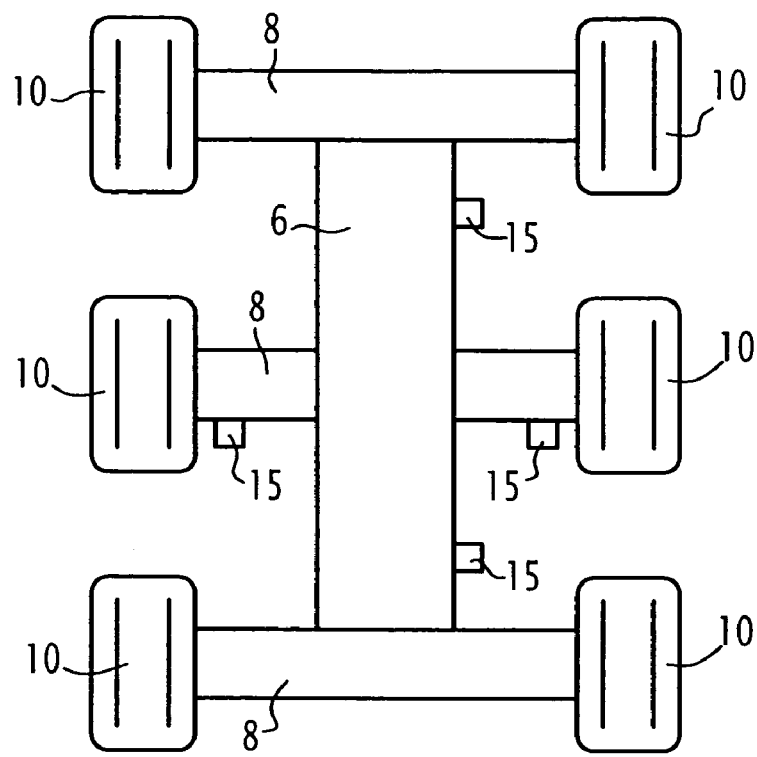
Figure 6:
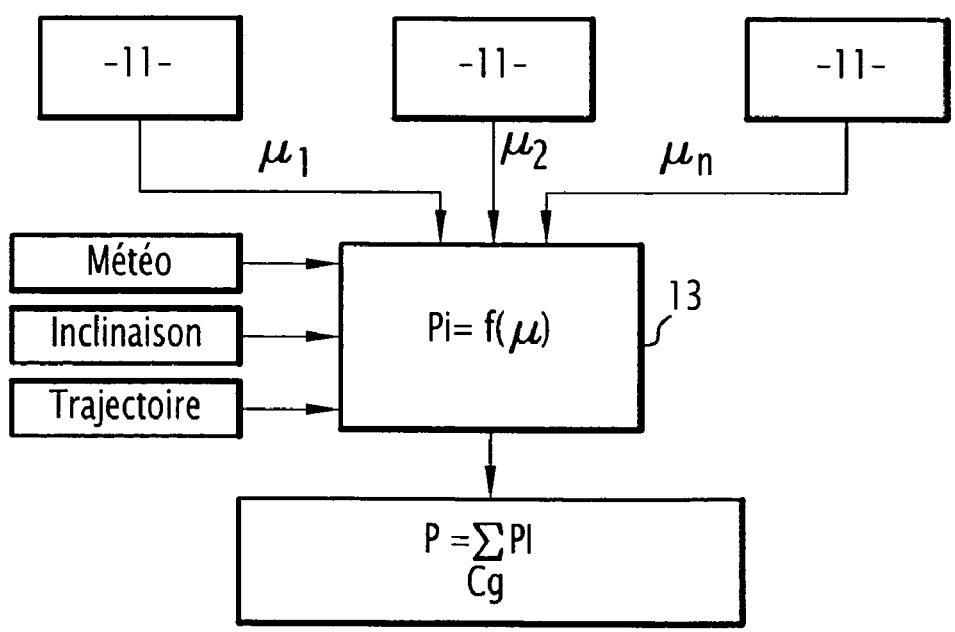

Other features and advantages of the invention will emerge clearly from its description which is given below by way of indication and in a non-limiting manner with reference to the appended figures, in which:

FIG. 1 is a perspective view of an airplane equipped with a device for determining its weight and/or a characteristic value of its trim according to the invention, FIG. 2 is a simplified view along the longitudinal direction of a part of an undercarriage of the airplane shown in FIG. 1, showing the sensors of the determination device, FIG. 3 is a cross-section of the undercarriage of FIG. 2 in a transverse vertical plane, FIG. 4 is a block diagram of the determination device shown in FIG. 1, FIG. 5 is a plan view of the undercarriage shown in FIGS. 2 and 3, showing different possibilities of installation of the sensors, and FIG. 6 is a logic diagram illustrating the different steps of the method of determining the weight and the position of the center of gravity of an aircraft using the device shown in FIG. 4.

An aircraft equipped with a device making it possible to determine the weight and the position of the center of gravity of the aircraft when the latter is standing on the ground is shown in FIG. 1. This aircraft is typically an airplane.

The device also makes it possible to access the distribution of the weight of the aircraft between the different undercarriages supporting that aircraft.

The device applies to the case of an airplane immobile on the ground or running slowly on the surface of the ground. This airplane typically comprises a fuselage C that is elongated in the longitudinal direction and delimiting the cockpit and the passenger cabin, two wings A disposed on either side of the fuselage C and three undercarriages 1 disposed under the airplane.

The front undercarriage is disposed under the front part of the fuselage C and the two rear undercarriages are disposed under the two wings A of the airplane.

The airplane stands on the ground by the intermediary of the three undercarriages 1, each of which supports a fraction of the weight of the airplane, and they transmit this weight to the ground.

As can be seen in FIGS. 2, 3 and 5, each undercarriage 1 comprises a vertical strut 2 mounted in a pivoting manner by an upper end 4 onto the fuselage, a longitudinal beam 6 rigidly fixed to a lower end of the vertical strut 2 distant from the fuselage, and three transverse axles 8 mounted on the longitudinal beam 6. The undercarriage also comprises six wheels 10 mounted at the ends of the axles 8. The undercarriage stands on the ground by the intermediary of the wheels 10.

The structural elements of the undercarriage such as the longitudinal beam 6, the axles 8 or the strut 2 exhibit mechanical stress levels that vary as a function of the fraction of the weight of the airplane supported by the undercarriage 1. In particular, the level of stresses in a predetermined transverse direction is a function of the fraction of the weight of the airplane supported by the undercarriage 1.

The device for determining the weight and/or the position of the center of gravity of the aircraft comprises, for each undercarriage, a device 11 for measuring a parameter representing the stress level in the predetermined transverse direction in a structural element of the undercarriage, in this case an axle 8, and computing means 13 for determining the weight and the position of the center of gravity as a function of the measured parameters.

The measured parameter is a magnetic or electrical characteristic of the structural element of the undercarriage, chosen among the magnetic permeability, the electrical conductivity or the electrical permittivity of the material constituting the structural element.

In a particularly advantageous manner, the measuring device 11 comprises (see FIG. 4) a current generator 14, a Foucault current sensor 15 provided with a primary circuit 16 powered by the current generator 14 and at least one secondary circuit 18, and means 22 of measuring the voltage at the terminals of the secondary circuit 18.

This sensor is disposed on the surface of the structural element on which the measurement must be made, pressed flat against this structural element.

The current generator 14 is able to excite the primary circuit 16 of the sensor 15 with a current I at a given frequency. The primary circuit 16 is able to generate, when it is excited by the generator, a magnetic field of specified spatial distribution depending on the distribution of the current I and therefore on the geometry of the primary circuit. This primary magnetic field generates an induced current in the structural element, and these induced currents, or Foucault currents, will give rise to a secondary magnetic field. This secondary magnetic filed has a distribution which varies over time and which opposes the variation of the primary magnetic field which gave rise to it.

The intensity and the depth of penetration of the induced currents in the structural element depend on the following parameters:

the physical properties of the material (electrical conductivity σ and magnetic permeability μ), the working frequency of the sensor, the possible presence of defects in the material, the geometry of the material, the quality of the coupling between the material and the inductive circuit.

The depth of penetration δ can be expressed mathematically by the following formula:

$$\delta = \frac{1}{\sqrt{\pi f \mu \sigma}}.$$

The secondary circuit 18 of the sensor 15 is sensitive to the variation of the magnetic field. The variations are due to the variations of the mechanical stresses applied to the structural element. The variations of this field which are due to the defects in the material and to its geometry are compensated for by means of calibrations of the sensor 15. In fact, the device undergoes three calibrations:

an initial calibration of the undercarriage and of the aircraft at zero (minimum stress) and at full scale (maximum stress), a calibration at zero before each flight, a weighing of the airplane every five years, at zero and at full scale.

The secondary circuits of the sensor 15 are able to be traversed by an induced electrical current created by the variations in the magnetic field. The voltage variations at the terminals of the secondary circuit depend on the variation of the magnetic field.

The computing means 13 comprises, for each undercarriage, a first module 131 able to evaluate, as a function of the intensity I of the current supplied to the primary circuit 16 of the corresponding sensor 15 and as a function of the voltage V collected at the terminals of the secondary circuit 18 of the same sensor 15, an impedance Z=V/I, a first memory 132 storing the magnetic or electrical characteristics of the structural element as a function of the modulus and the phase of the electrical impedance Z, and a second module 133 able to determine the magnetic or electrical characteristic μi of the structural element of the undercarriage as a function of the impedance z determined by the first module 131 and of the content of the memory 132.

The computing means 13 also comprise a third module 134 able to determine the fraction Pi of the weight of the airplane supported by each undercarriage as a function of the magnetic or electrical characteristics μi determined by the second modules 133, and a fourth module 135 able to determine the position of the center of gravity of the airplane and the total weight of the airplane as a function of the fractions Pi computed by the third module 134.

The computing means 13 are constituted by a specific computer for the device for determining the position of the weight and of the center of gravity of the aircraft, or are integrated in another computer of the aircraft.

It will be noted that, generally, each undercarriage is equipped with two sensors 15, measuring the magnetic or electrical characteristic of the structural element along the predetermined direction.

As shown in FIG. 5, these sensors 15 can be disposed in different places, along the longitudinal beam 6 or along the axles 8.

As a variant, each undercarriage cab be equipped, in addition to the sensor measuring the magnetic or electrical characteristic along the predetermined direction, with several other sensors. These sensors measure the magnetic or electrical characteristics along other directions, and/or the variations in these magnetic or electrical characteristics resulting from the torsion or shear force. These forces are imposed on the structural element by the weight of the airplane. These measurements are used for correcting the measurement of the magnetic or electrical characteristic along the predetermined transverse direction.

This correction is particularly useful when the sensors 15 measuring the magnetic or electrical characteristic along the predetermined direction are disposed in a zone undergoing stresses not only in this predetermined direction but also in other directions.

The method of determining the position of the center of gravity of the airplane will now be explained with reference to FIG. 6. Firstly, there is measured, in a first step a/, for each undercarriage of the airplane, the magnetic or electrical characteristic μi of the structural element of that undercarriage along the predetermined direction, using the measuring device 11.

In order to do this, the primary circuit 16 of the sensor 15 is excited and the voltage at the terminals of the secondary circuit 18 of the same sensor 15 is measured.

Then the impedance Z=V/I is evaluated. This impedance is characterized by its phase Arg Z and by its modulus |Z|.

The sought magnetic or electrical characteristic μi of the structural element is determined as a function of the modulus and of the phase of the electrical impedance computed by the computing means.

If necessary, in a step a'/, the value of the characteristic μi is corrected according to the measurements made with the sensors measuring the magnetic or electrical characteristics in other directions, or measuring their variations resulting from a torsion or a shear force.

Then, in a second step b/, the position of the center of gravity of the airplane is evaluated as a function of the magnetic or electrical characteristics ($\mu_1, \mu_2, \ldots, \mu_n$) of the structural elements of the different undercarriages of the airplane measured in step a/. Step b/ breaks down into two sub-steps: a sub-step b1/ of evaluation of the fraction Pi of the weight of the airplane transmitted to the ground through each undercarriage as a function of the magnetic or electrical characteristics measured in step a/ and a second sub-step b2/ of determining the position of the center of gravity Cg of the airplane as a function of the fractions evaluated in sub-step b1/.

The fraction Pi of the weight of the aircraft transmitted by each undercarriage is evaluated as a function of the magnetic or electrical characteristics $\mu_i$ measured in step a/ by means of one or more transfer functions. These transfer functions are predetermined and are stored in a second memory 136 of the computing means 13 (FIG. 4). They take into account a certain number of parameters such as meteorological parameters, the inclination of the runway or the predicted path of the airplane, in such a way as to increase the final precision of the evaluation of the distribution of the weight of the airplane over the undercarriages.

As a variant, tables or mappings are used instead of transfer functions.

Once the weight supported by each undercarriage of the airplane is known, it is possible to determine the total weight P of the airplane very simply by adding the weights supported by each undercarriage.

The position of the center of gravity of the airplane is then determined by a simplified formula, by calculating the barycenter of the positions of the three undercarriages allocated with a weight corresponding to the fraction of the total weight of the airplane supported by each of the undercarriages. The longitudinal position of the center of gravity of the airplane Cgl is therefore expressed by the following formula:

$$Cgl = \Sigma li \frac{Pi}{P}$$

where:
li is the longitudinal position of each of the undercarriages i,
Pi is the fraction of the total weight of the airplane supported by the undercarriage i.

The transverse position of the center of gravity of the airplane is expressed by the following formula:

$$Cgt = \Sigma ti \frac{Pi}{P}$$

where:
ti represents the transverse position of each of the undercarriages i.

It can therefore be seen that the method and the device described above have multiple advantages.

The device makes it possible to determine the position of the center of gravity of the airplane very simply and continuously.

This is particularly advantageous for high-capacity transport airplanes, in particular for freight airplanes. In fact, the overloading of an airplane or a poor positioning of pallets can modify its aerodynamic behavior once in flight or during takeoff. The device makes it possible to optimize the mass loaded in it as well as its trim and to ensure that it remains within the operational limit of the airplane.

The device of the invention makes it possible to detect in real time cases where the distribution of the mass transported is not uniform and to correct its distribution on board the airplane. Furthermore, the device makes it possible to know continuously the weight of the aircraft and to ensure that it remains within the operational limit authorized for it.

It will be noted that the invention applies to the case of an airplane comprising less or more than three undercarriages, for example five undercarriages.

Similarly, each undercarriage can comprises less or more than three axles, for example one or two axles, and therefore less or more than six wheels, for example two wheels or four wheels.

The invention claimed is:

1. A method of determining the weight and/or a characteristic value of the position of the centre of gravity of an aircraft having a plurality of undercarriages (1) standing on the ground, each undercarriage (1) comprising at least one structural element (6, 8) exhibiting a variable level of stresses depending on the fraction (Pi) of the weight (P) of the aircraft transmitted to the ground through said undercarriage (1), this method comprising the following steps:

a/ measurement on each undercarriage (1) of at least one parameter representing the stress level of said element;

b/ evaluation of the characteristic value and/or of the weight according to the parameters measured in step a/;

wherein at least one parameter measured in step a/ is a magnetic or electrical characteristic of the structural element (6, 8, 2) of the undercarriage.

2. The method as claimed in claim 1, wherein the magnetic or electrical characteristic measured is a characteristic chosen from the group consisting of the magnetic permeability ($\mu$), the electrical conductivity ($\sigma$) and the electrical permittivity of the material constituting the structural element (6, 8, 2)

3. The method as claimed in claim 1, wherein the magnetic or electrical characteristic is measured by mans of a Foucault current sensor (15).

4. The method as claimed in claim 1, wherein step b/ comprises a sub-step b1/ of evaluation of the fraction (Pi) of the weight of the aircraft transmitted to the ground by each undercarriage (1) as a function of the parameters measured in step a/, and a substep b2/ of determining the position of the center of gravity of the aircraft as a function of the fractions (Pi) evaluated in sub-step b1/.

5. The method as claimed in claim 4, wherein the fraction (Pi) of the weight of the aircraft transmitted through each undercarriage (1) is evaluated as a function of the magnetic or electrical characteristic measured in step a/ by means of a transfer function.

6. The method as claimed in claim 1, wherein the magnetic or electrical characteristic is measured in a single direction along which the level of stresses in the structural element (6, 8, 2) varies as a function of the fraction (Pi) of the weight of the aircraft transmitted to the ground through said undercarriage.

7. The method as claimed in claim 6, wherein there is measured on the structural element (6, 8, 2) in step a/ the magnetic or electrical characteristic in at least one other predetermined direction and/or the variation of the magnetic or electrical characteristic resulting from the torsion or shear force imposed on the structural element (6, 8, 2), these measurements being used to refine the evaluation of the representative value carried our in step b/.

8. A device for determining the weight and/or a characterisnac value of the position of the centre of gravity of an aircraft standing on the ground by means of a plurality of undercarriages (1), each undercarriage (1) comprising at least one structural element (6, 8, 2) exhibiting a level of stresses that varies as a function of the fraction (Pi) of the weight of the aircraft transmitted to the ground through said undercarriage (1), this device comprising on each undercarriage (1) at least one sensor (15) for measuring a parameter representing the stress level of said element and means for determining the characteristic value as a function of the measured parameters, wherein the sensor is able to measure, as a representative parameter, a magnetic or electrical characteristic of the structural element (6, 8, 2) of the undercarriage (1).

9. The device as claimed in claim 8, wherein the sensor is able to measure a magnetic or electrical characteristic chosen from the group consisting of the magnetic permeability ($\mu$), the electrical conductivity ($\sigma$) and the electrical permittivity of the material constituting the structural element (6, 8, 2).

10. The device as claimed in claim 8, wherein the sensor (15) for measuring the magnetic or electrical characteristic is a Foucault current sensor.

11. The device as claimed in claim 8, wherein it comprises means for evaluating the fraction (Pi) of the weight of the aircraft transmitted to the ground though each undercarriage (1) as a function of the measured parameters, and means for evaluating the position of the center of gravity of the aircraft as a function of the evaluated fractions.

12. The device as claimed in claim 11, wherein the means for determining the fraction (Pi) of the weight of the aircraft transmitted through each undercarriage comprise at least one transfer function.

13. An aircraft comprising a plurality of undercarriages (1) able to stand on the ground whilst supporting the weight of the aircraft and a device for determining the weight and/or a characteristic value of the position of the centre of gravity of the aircraft as claimed in claim 8, each undercarriage (1) comprising at least one structural element (6, 8, 2) exhibiting a level of stresses that varies as a function of the fraction (Pi) of the weight of the aircraft transmitted to the ground through said undercarriage.

14. The method as claimed in claim 2, wherein the magnetic or electrical characteristic is measured by means of a Foucault current sensor (15).

15. The device as claimed in claim 9, wherein the sensor (15) for measuring the magnetic or electrical characteristic is a Foucault current sensor.

16. The device as claimed in claim 9, vherein it comprises means for evaluating the fraction (Pi) of the night of the aircraft transmitted to the ground though each undercarriage (1) as a function of the measured parameters, and means for evaluating the position of the center of gravity of the aircraft as a function of the evaluated fractions.

17. The device as claimed in claim 10, wherein it comprises means for evaluating the fraction (Pi) of the night of the aircraft transmitted to the ground though each undercarriage (1) as a function of the measured parameters, and means for evaluating the position of the center of gravity of the aircraft as a function of the evaluated fractions.

18. A method of determining at least one of a weight and characteristic value of a position of a centre of gravity of an aircraft, comprising:

measuring on each undercarriage of the aircraft a stress level of at least one structural element of each undercarriage with a sensor attached to the at least one structural element, the sensor measuring at learnt one of a magnetic and electrical characteristic of the at least structural element; and evaluating the at least one of the weight and characteristic value according to the measuring, wherein, the at least one structural element exhibits a variable level of stress depending on the fraction of the weight borne by each undercarriage of the aircraft.

* * * * *